(12) United States Patent
Suggs

(10) Patent No.: US 9,745,732 B2
(45) Date of Patent: Aug. 29, 2017

(54) TOILET ODOR CONTROL DEVICE

(71) Applicant: Roger Lendsey Suggs, Plant City, FL (US)

(72) Inventor: Roger Lendsey Suggs, Plant City, FL (US)

( * ) Notice: Subject to any disclaimer, the term of this patent is extended or adjusted under 35 U.S.C. 154(b) by 157 days.

(21) Appl. No.: 14/953,257

(22) Filed: Nov. 27, 2015

(65) Prior Publication Data
US 2017/0152654 A1    Jun. 1, 2017

(51) Int. Cl.
*E03D 9/04* (2006.01)
*E03D 9/052* (2006.01)
*A47K 13/26* (2006.01)
*B01D 46/00* (2006.01)
*B01D 53/04* (2006.01)

(52) U.S. Cl.
CPC .............. *E03D 9/052* (2013.01); *A47K 13/26* (2013.01); *B01D 46/0036* (2013.01); *B01D 46/0038* (2013.01); *B01D 53/0415* (2013.01); *B01D 2253/102* (2013.01); *B01D 2257/90* (2013.01)

(58) Field of Classification Search
CPC .................................. E03D 9/05; E03D 9/052
USPC ........................................... 4/213–218, 420.2
See application file for complete search history.

(56) References Cited

U.S. PATENT DOCUMENTS

| 6,233,750 | B1* | 5/2001 | Donald | E03D 9/007 |
| | | | | 4/213 |
| 9,399,862 | B2* | 7/2016 | Gallardo Chaparro | E03D 9/05 |
| 2008/0000017 | A1* | 1/2008 | Littrell | E03D 9/052 |
| | | | | 4/213 |
| 2013/0205484 | A1* | 8/2013 | Taciuc | A47K 13/307 |
| | | | | 4/209 R |

* cited by examiner

*Primary Examiner* — Christine Skubinna
(74) *Attorney, Agent, or Firm* — Lonnie R. Drayer

(57) ABSTRACT

A toilet odor control device according to the present invention has an air filtration unit and a mounting and air intake unit that allows the two units to be separated from and reattached to one another by sliding the air filtration unit relative to the mounting and air intake unit. This feature allows convenient access to the air filtration unit to change filter cartridges and batteries in the air filtration unit without removing the entire device from a toilet. The mounting and air intake unit is provided with adjustable members for receiving fasteners for fastening the mounting and air intake unit to a toilet at a location intermediate of a toilet seat and the rim of a bowl of a toilet.

20 Claims, 15 Drawing Sheets

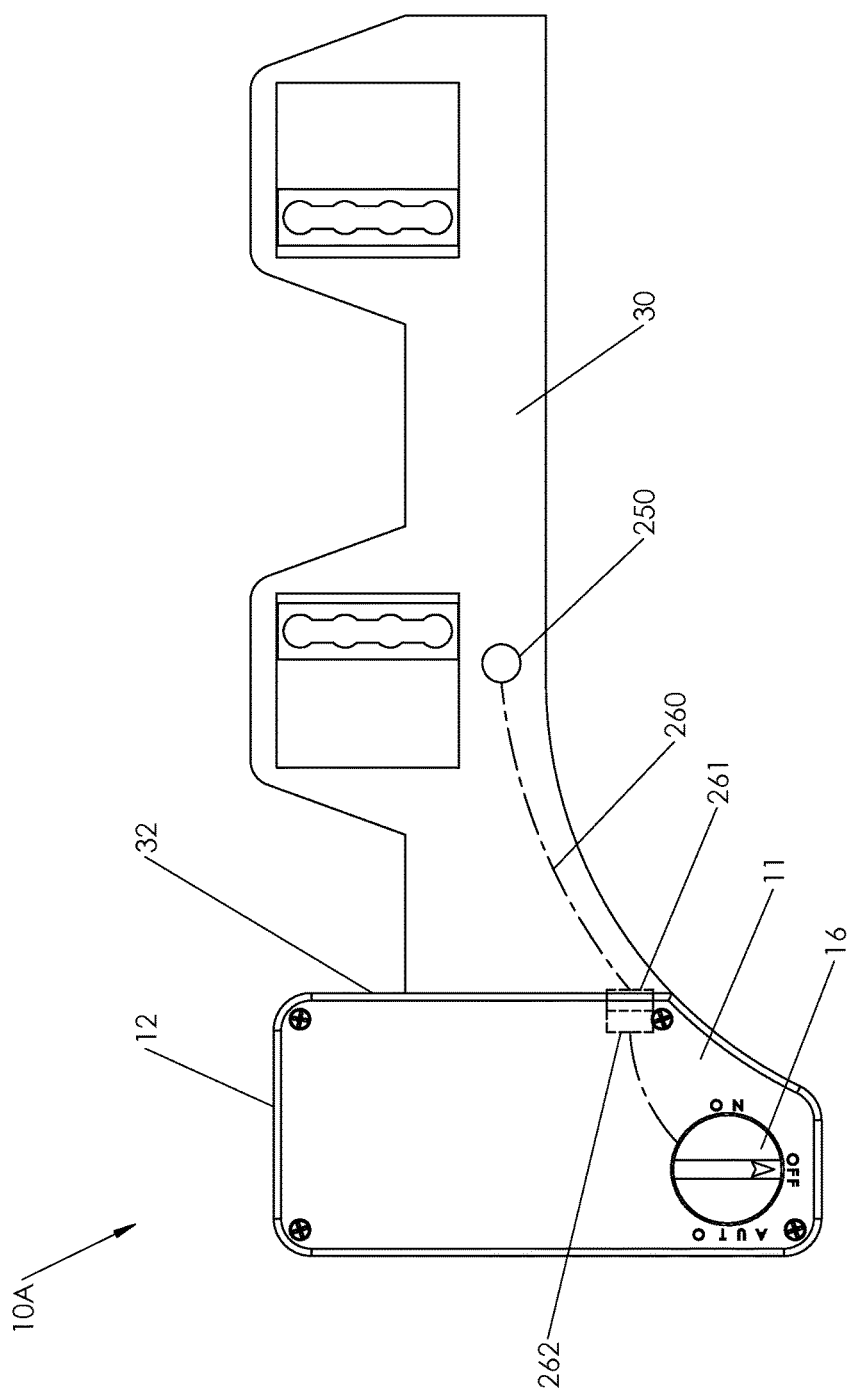

TOILET ODOR CONTROL DEVICE

FIELD OF THE INVENTION

The present invention relates to a device for controlling odor associated with a toilet.

BACKGROUND OF THE INVENTION

The challenge of removing unpleasant odors from a bathroom is as old as indoor plumbing. Over the years inventors have met this challenge by developing numerous and diverse devices to battle unpleasant bathroom odors.

DISCUSSION OF THE PRIOR ART

U.S. Pat. No. 4,168,553 teaches a toilet odor eliminating device that is provided with a rear flange part formed with bores for accommodating the bolts of a toilet seat. Piping extends from the area of the rear of the toilet bowl to a filter and an exhaust outlet located behind the toilet bowl in the region of the water storage tank of the toilet. Access to the filter for servicing the filter is difficult. U.S. Pat. No. 5,199,111 teaches a device very similar to that taught in U.S. Pat. No. 4,168,553 but having a remotely located exhaust fan.

U.S. Pat. No. 4,876,748 teaches a toilet bowl ventilating and deodorizing device including a member that rests on the rim of a toilet bowl to take in air that travels through a conduit to a separate filtering unit resting on the floor near the toilet. The filtering unit is provided with a fan.

U.S. Pat. No. 5,161,262 teaches an apparatus for removing odors from toilets includes a housing having telescoping sections that rest between a toilet seat and toilet tank. Each section defines a wide, thin air inlet that is disposed adjacent the toilet bowl rim.

U.S. Pat. No. D 327,538 teaches a toilet odor exhaust unit having an air intake member connected to a processing unit by a flexible conduit.

SUMMARY OF THE INVENTION

A toilet odor control device according to the present invention has an air filtration unit and a mounting and air intake unit that allows the two units to be separated from and reattached to one another by sliding the air filtration unit relative to the mounting and air intake unit. This feature allows convenient access to the air filtration unit to change filter cartridges and batteries in the air filtration unit without removing the entire device from a toilet. The mounting and air intake unit is provided with adjustable members for receiving fasteners for fastening the mounting and air intake unit to a toilet at a location intermediate of a toilet seat and the rim of a bowl of a toilet.

BRIEF DESCRIPTION OF THE DRAWINGS

FIG. 15 is a top view of another exemplary toilet odor control device of the present invention that can function automatically.

DETAILED DESCRIPTION OF THE INVENTION

Figure 1:
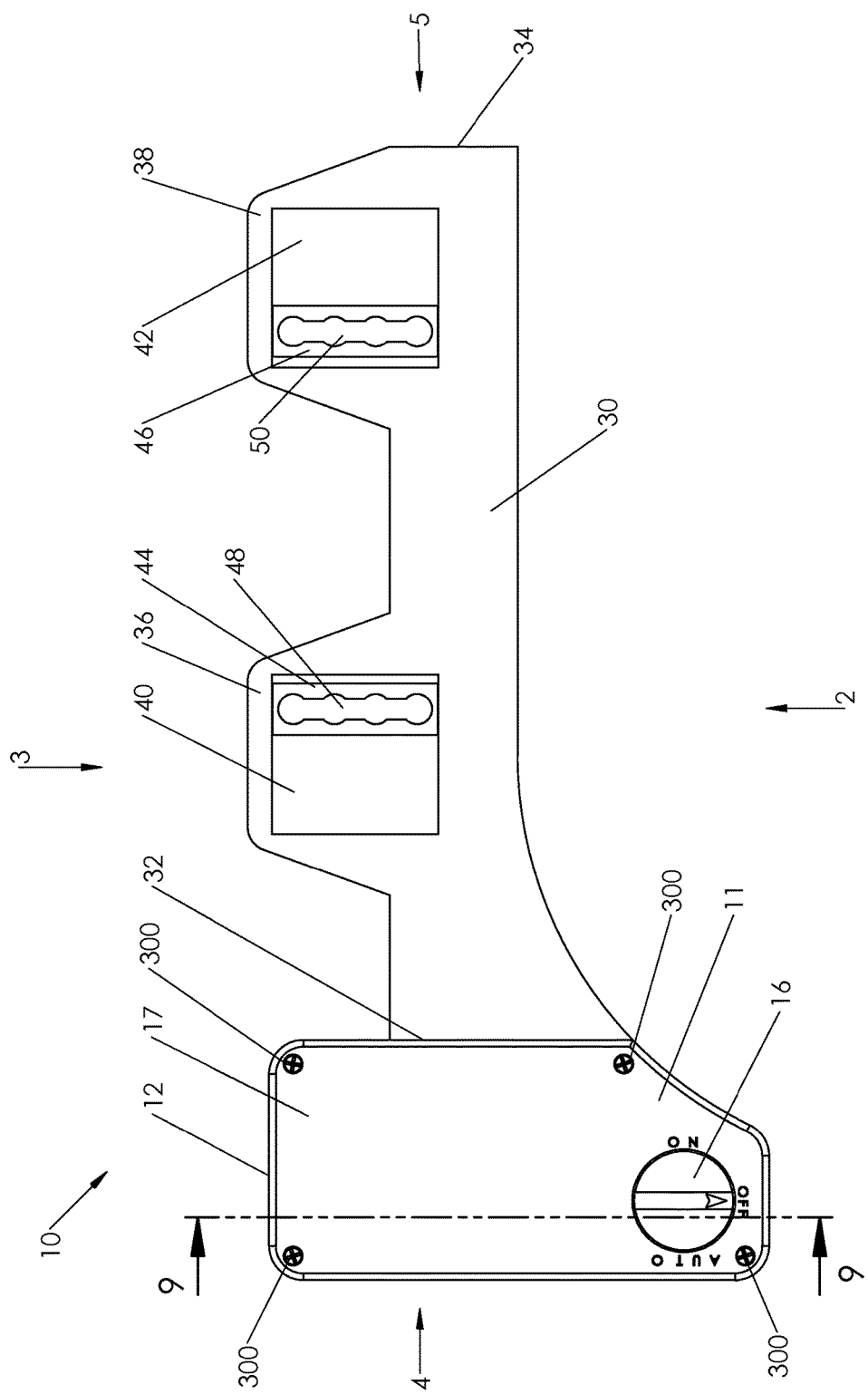
FIG. 1 is a top view of an exemplary toilet odor control device of the present invention.

Referring first to FIG. 1 there is shown a top view of an exemplary toilet odor control device 10 of the present invention. The exemplary toilet odor control device comprises an air filtration unit 11 including a housing 12 having a removable top 17. A control switch knob 16 is located on the top 17 of the housing of the air filtration unit 11. The top 17 is preferably a separate piece from the remainder of the housing 12 to facilitate assembly of the air filtration unit 11. The top 17 is shown fixed to the remainder of the housing by appropriate fasteners 300 selected in accordance with good engineering practices. Alternatively the top may be attached to the top may be fixed to the remainder of the housing with an adhesive, a snap on arrangement, or any other suitable method selected in accordance with good engineering practices. The exemplary toilet odor control device further comprises a mounting and air intake unit 30. A first end 32 of the mounting and air intake unit is proximal to and attached to the air filtration unit 11. A second end 34 of the mounting and air intake unit 30 is distal from the air filtration unit 11.

Figure 7:
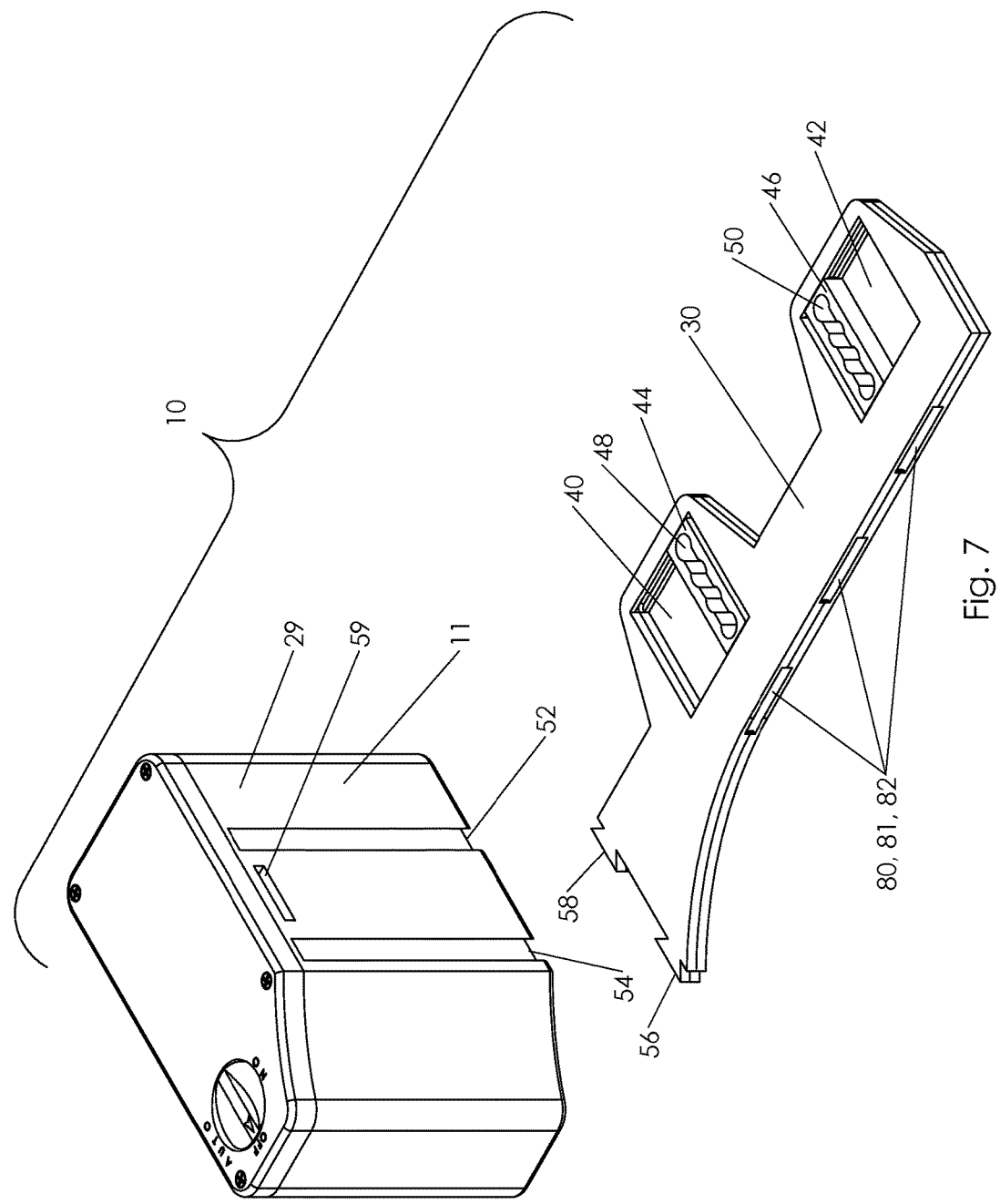
FIG. 7 is an exploded view perspective view looking towards the front side of the exemplary toilet odor control device with the mounting and air intake unit separated from the filtration unit.

More features of the exemplary toilet odor control device 10 can be described referring next to FIG. 1 along with FIG. 7. Fig. is an exploded view perspective view looking towards the front side of the exemplary toilet odor control device 10 with the mounting and air intake unit 30 separated from the air filtration unit 11. First and second spaced apart attachment tabs 56, 58 project from the mounting and air intake unit 30. A first side wall 29 of the housing 12 of the filtration unit 11 is provided with grooves 52, 54 for receiving the attachment tabs 56, 58 of the mounting and air intake unit 30. In the exemplary device shown in the drawings the attachment tabs 56, 58 and grooves 52, 54 are configured to mate in a dovetail manner as shown in a bottom view in FIG. 1A. The filtration unit 11 is easily attached to and detached from the mounting and air intake unit 30 with a simple sliding motion. This feature allows the mounting and air intake unit to be fixed in an operative configuration with a toilet and thereafter to attach the filtration unit to the mounting and air intake unit. Furthermore if necessary the filtration unit can be easily detached from the mounting and air intake unit to facilitate access to replace batteries and filter cartridges, then reattached to the mounting and air intake unit.

Figure 5:
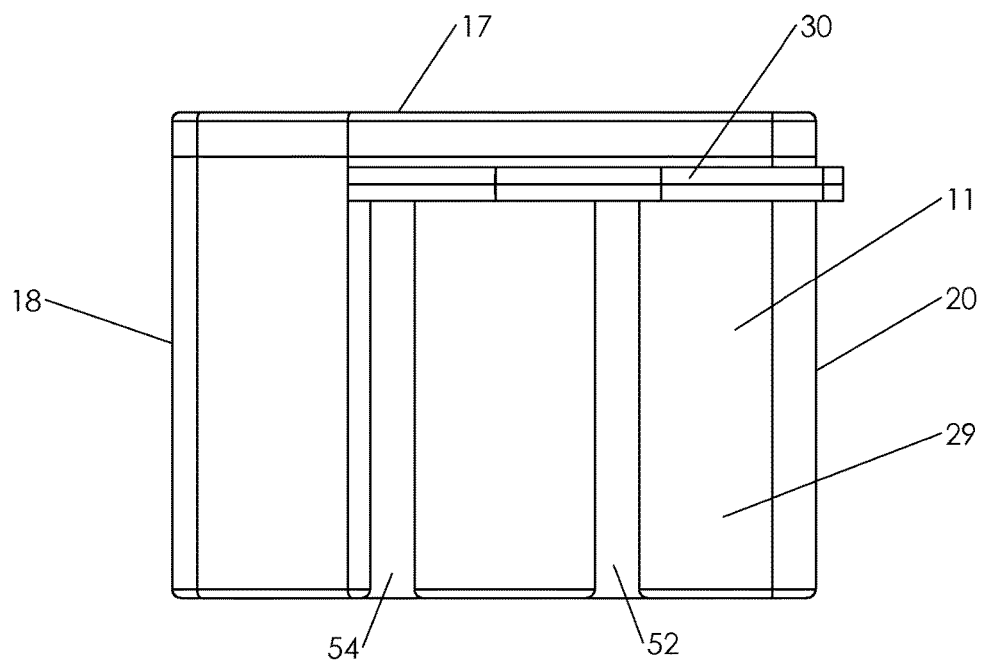
FIG. 5 is a side elevation view of the exemplary toilet odor control device looking in a direction indicated by arrow 5 in FIG. 1.

FIG. 5 is a side elevation view of the exemplary toilet odor control device looking in a direction indicated by arrow 5 in FIG. 1 with the mounting and air intake unit 30 fixed to the air filtration unit 11 using the grooves 52, 54 in the first side wall 29 of the filtration unit 11. In the exemplary toilet odor control device the mounting and air intake unit 30 is fixed to the filtration unit 11 by a tight fit between the attachment tabs 56, 58 and interior surfaces of the grooves 52, 54 that allows relatively easy separation of the mounting and air intake unit 30 with a sliding motion. In the exemplary device the mounting and air intake unit 30 is displaced a short distance from the top side 17 of the air filtration unit as shown in FIGS. 2, 3 and 5.

Figure 4:
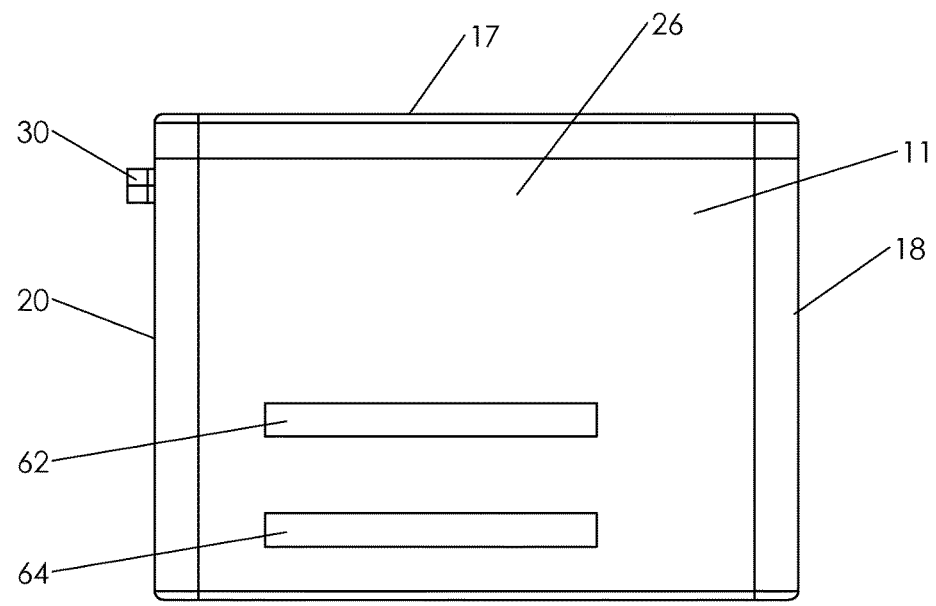
FIG. 4 is a side elevation view of the exemplary toilet odor control device looking in a direction indicated by arrow 4 in FIG. 1.

To aid in understanding the relative locations of components of the exemplary toilet odor control device the front side 18 and rear side 20 of the filtration unit housing 12 are identified in FIGS. 4 and 5. As used herein and in the claims the "front side" of the toilet odor control device is the side that faces away from the toilet tank 106 (see FIG. 12) when the toilet odor control device is mounted to a toilet in an operative configuration as shown in FIGS. 10 to 13. As used herein and in the claims the "rear side" of the toilet odor control device is the side that faces towards the toilet tank 106 when the toilet odor control device is mounted to a toilet in an operative configuration as shown in FIGS. 10 to 13.

Figure 1A:
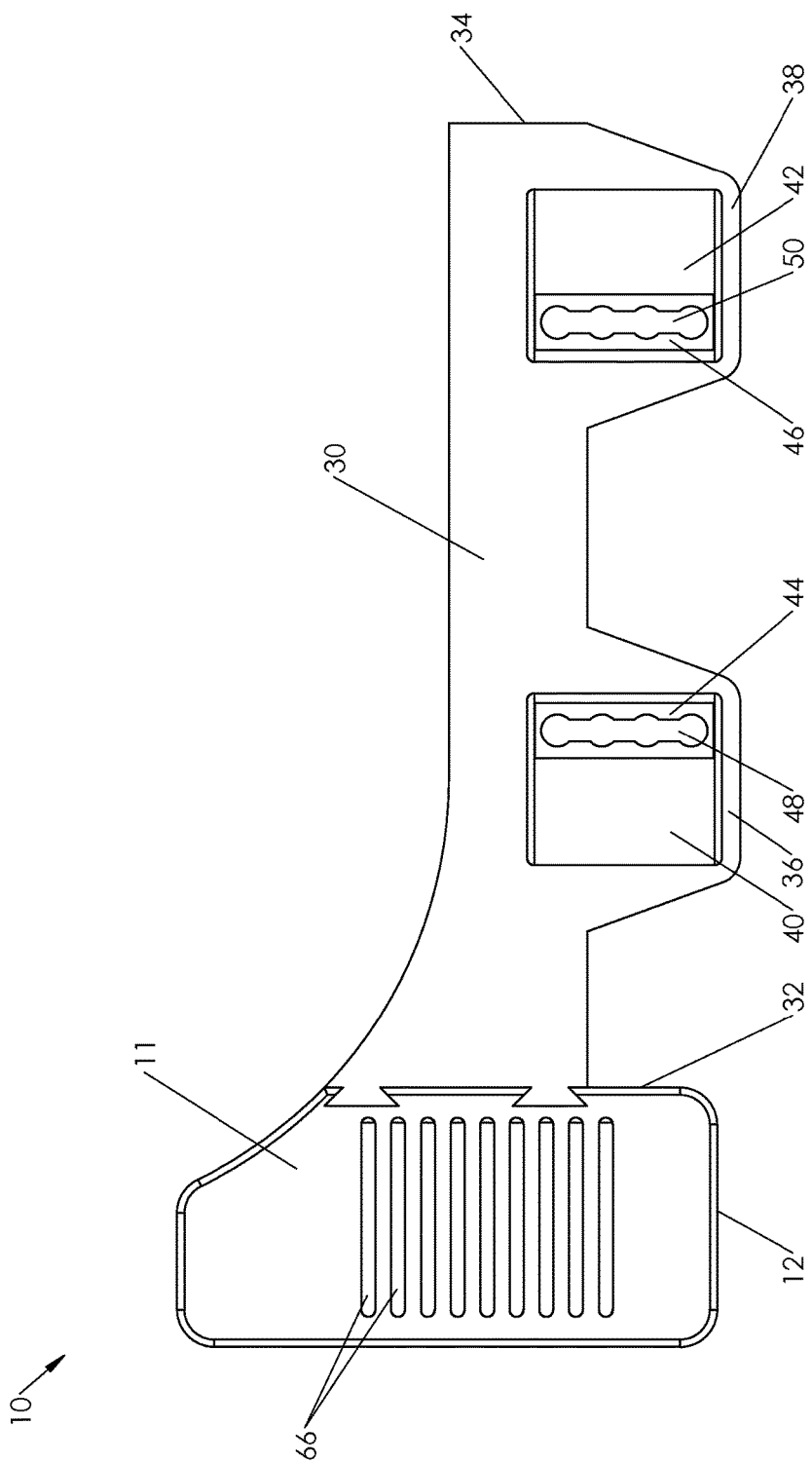
FIG. 1A is a bottom view of the exemplary toilet odor control device.
Figure 2:
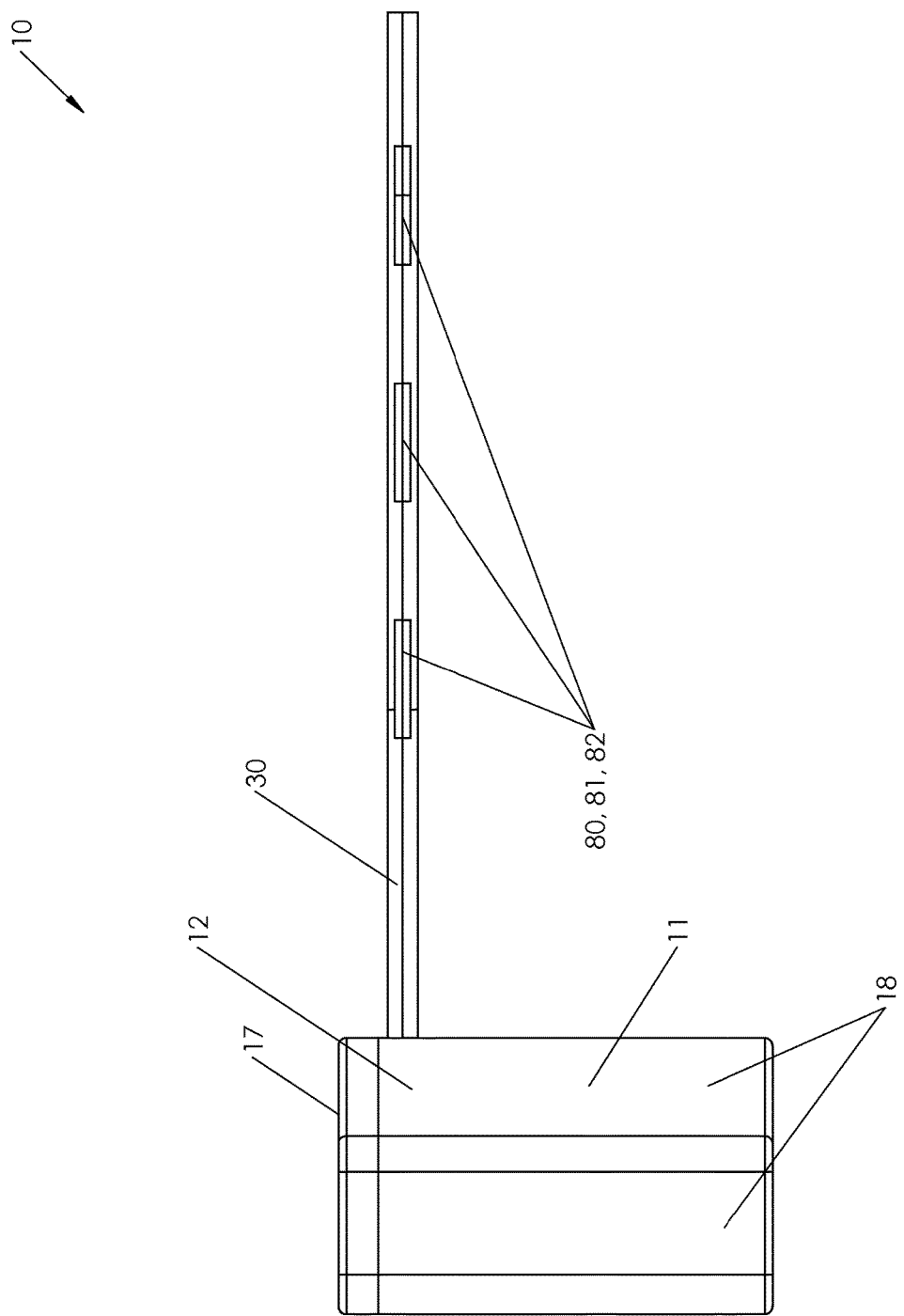
FIG. 2 is a front elevation view of the exemplary toilet odor control device looking in a direction indicated by arrow 2 in FIG. 1.
Figure 3:
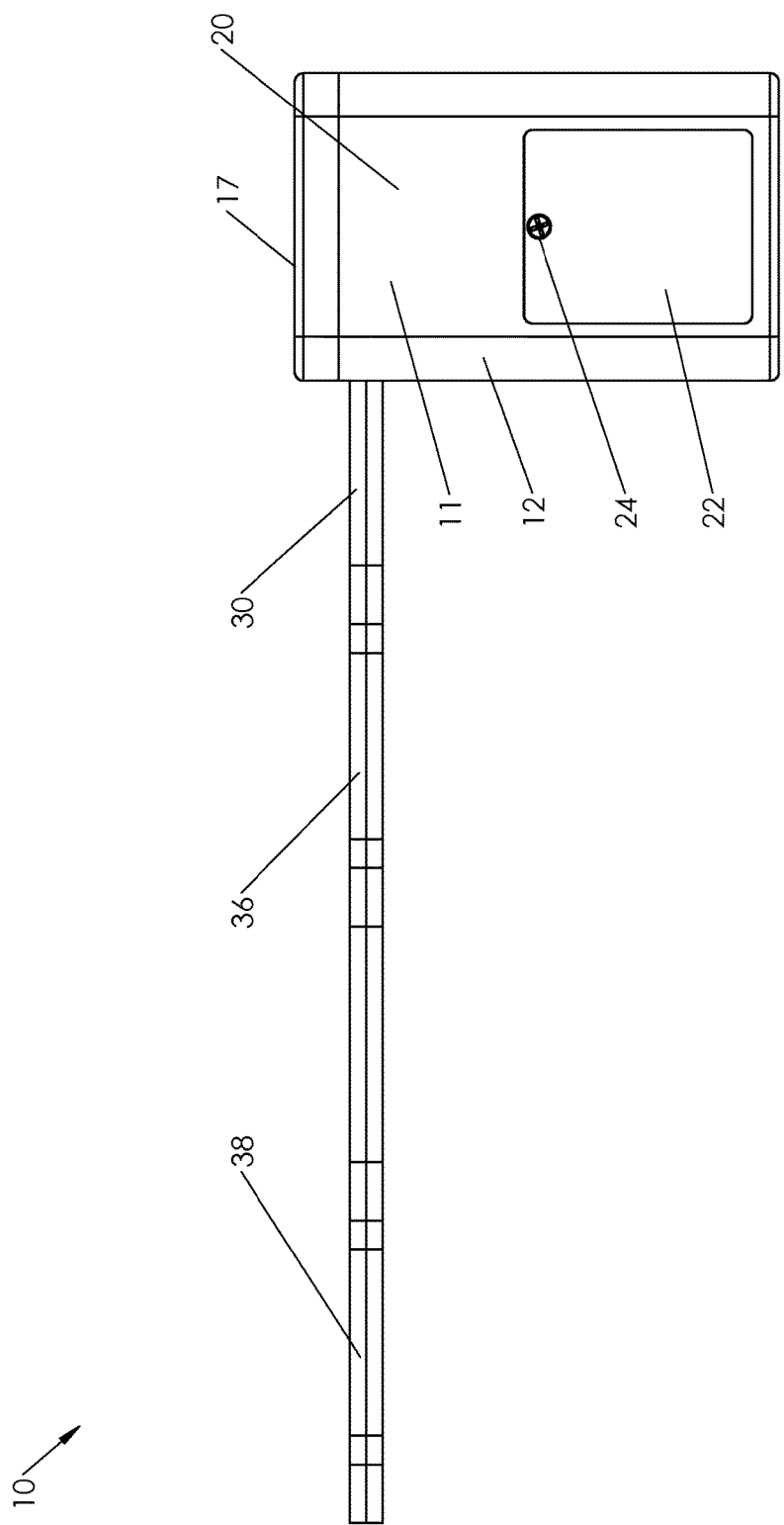
FIG. 3 is a rear elevation view of the exemplary toilet odor control device looking in a direction indicated by arrow 3 in FIG. 1.

Other features of the exemplary toilet odor control device 10 according to the present invention may be understood by referring again to FIGS. 1 and 7 in conjunction with FIGS. 1A, 2, and 3. FIG. 1A is a bottom view of the exemplary toilet odor control device. FIG. 2 is a front elevation view looking towards the front side of the exemplary toilet odor control device in a direction indicated by arrow 2 in FIG. 1. FIG. 3 is a rear elevation view looking towards the rear side of the exemplary toilet odor control device looking in a direction indicated by arrow 3 in FIG. 1. The mounting and air intake unit 30 has a pair of protrusions 36, 38 extending from a rear side thereof. The mounting and air intake unit 30 has a pair of openings 40, 42 extending through it, with each of the openings passing at least partially through each of the protrusions 36, 38. A size adjuster 44, 48 is located in each of the openings. Each of the size adjusters has a slot 48, 50 through it with the widths of the slots having wide and narrow portions to accommodate fasteners 200 for fixing the toilet odor control device, and if desired a toilet seat, to a toilet. The locations of the size adjusters in the openings can be adjusted to accommodate the alignments of fasteners used for fastening the toilet odor control device, and if desired a toilet seat, to toilets having a variety of configurations of mounting holes. The structure and function of the size adjusters 44, 48 is best understood with reference to FIG. 8 which is an exploded view of the mounting and air intake unit 30. Attachment tabs 84, 85 are located at each end of each of the size adjusters 44, 48. Ledges 86, 87 are located at opposing ends 88*a*, 88B; 89A, 89B of each of the openings 40, 42 in the top member 30A and bottom member 30B of the mounting and air intake unit 30. The mounting and air intake unit 30 is assembled by placing the size adjusters 44, 48 in the openings 40, 42 in the bottom member 30B with the attachment tabs 84, 85 on the ledges 86, 87 then pressing the pins 200 of the bottom member 30B into complementary wells (not shown) in the mating surface of the top member 30A to secure the top and bottom members to one another. The attachment tabs 84, 85 of the size adjusters can now slide along in complementary grooves provided by the ledges 86, 87. It is anticipated that the components of the mounting and air intake unit 30 be molded of a suitable polymer selected in accordance with good engineering practices.

Figure 8:
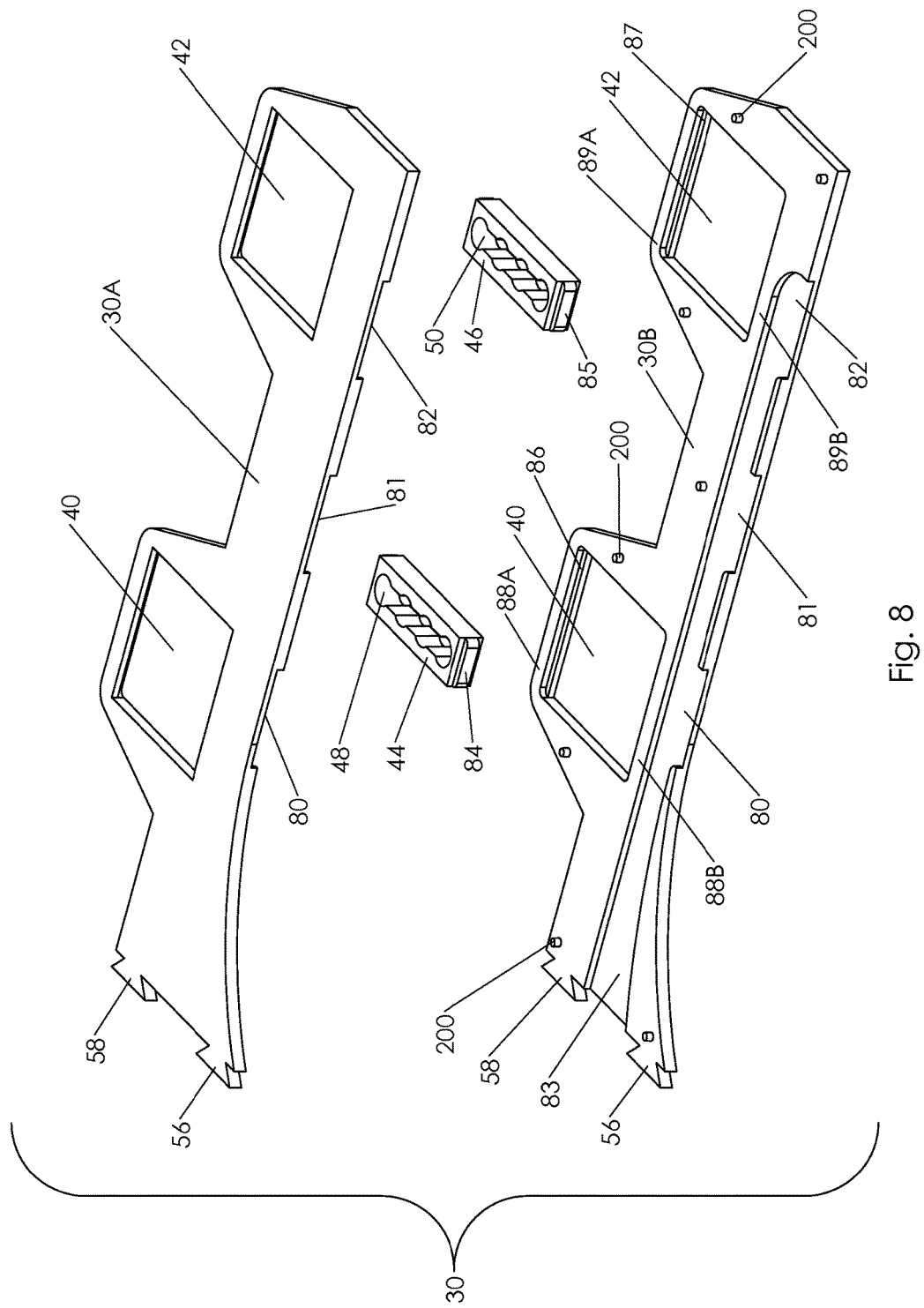
FIG. 8 is an exploded view of the mounting and air intake unit.

Air enters the mounting and air intake unit 30 through air intake passages 80, 81 and 82 that are shown in FIGS. 2, 7 and 8. When the toilet odor control device 10 is fixed to a toilet in an operative configuration the air intake passages 80, 81 and 82 are disposed on the "front side" of the toilet odor control device that faces away from the toilet tank. In the exemplary toilet odor control device the mating surfaces of the top member 30A and bottom member 30B of the mounting and air intake unit 30 are substantially mirror images (except for the attachment features). The air intake passages 80, 81 and 82 are in communication with a duct 83 and allow ambient air to enter the duct 83 that conducts the incoming ambient air to the filtration unit 11 via an aligned air inlet passage 59 in the first side wall 29 of the housing 12 of the filtration unit 11 which is best shown in FIG. 7.

Referring again to FIG. 3 which is a rear elevation view looking towards the rear side of the exemplary toilet odor control device 10 discloses that a rear side 20 of the housing 12 of the filtration unit 11 is provided with a battery cover 22 secured to the housing 12 with a fastener 24.

Figure 6:
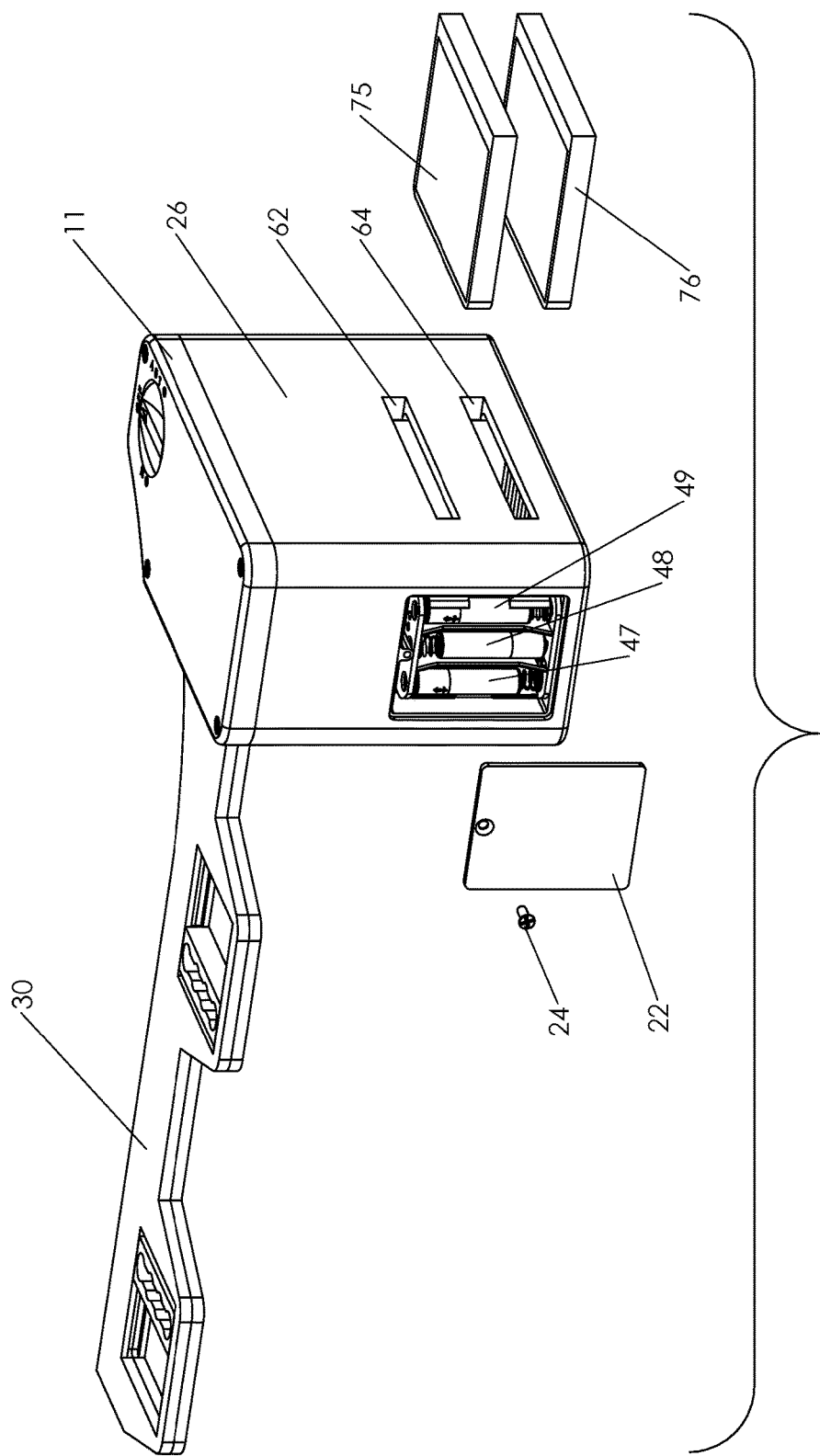
FIG. 6 is a perspective view of the exemplary toilet odor control device looking towards the rear side of the device with the battery cover and filter cartridges removed.

FIG. 6 is a perspective view of the exemplary toilet odor control device 10 looking towards the rear side of the device with the battery cover 22 and filter cartridges 75, 76 removed. The exemplary device is shown having three AA cells mounted in communication with an appropriate battery holder. FIG. 4 is a side elevation view of the exemplary toilet odor control device looking in a direction indicated by arrow 4 in FIG. 1. A second sidewall 26 of the housing of the filtration unit 11 extends between front side 18 and rear side 20 of the filtration unit housing. The second sidewall 26 of the housing is provided with filter receiving slots 62, 64. While the exemplary toilet odor control device is provided with two filter receiving slots it is understood that a toilet odor control device may be provided with only one, or more than two, filter receiving slots without deviating from the spirit and scope of the present invention.

Figure 9:
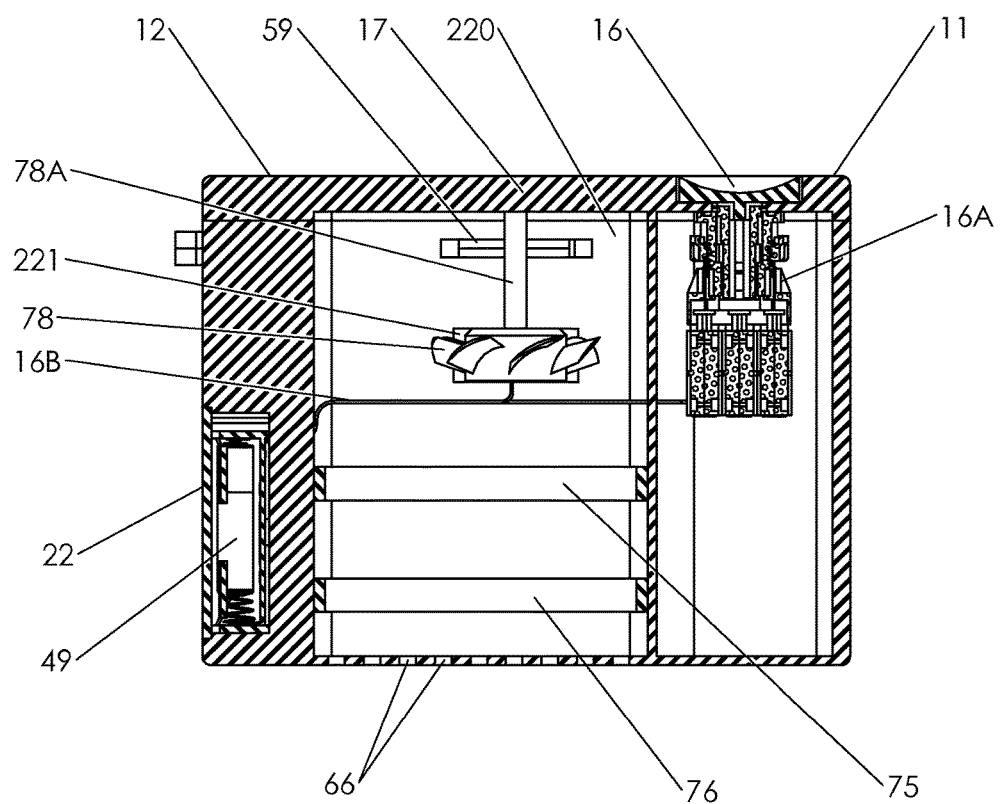
FIG. 9 is a section view of the air filtration unit taken at line 9-9 of FIG. 1.

FIG. 9 is a section view of the air filtration unit taken at line 9-9 of FIG. 1. Incoming air passes from the duct 83 of the mounting and air intake unit 30 through the air inlet passage 59 in the first side wall of the housing into a chamber 220. The filter cartridges 75, 76 are located in the chamber 220 having been inserted into the filter receiving slots 62, 64. The filter cartridges may be of identical construction, but it may be advantageous for the air to pass first through an activated charcoal filter 75 to remove undesirable odors and then through a scented filter 76 to add fragrance to the filtered air before the air is exhausted from the air filtration unit via air exhaust openings 66 in a bottom wall of the housing of the air filtration unit 11 housing. It is anticipated that the components of the housing and top of the filtration unit be molded of a suitable polymer selected in accordance with good engineering practices.

FIG. 1A is a bottom view of the exemplary toilet odor control device 10 showing the air exhaust openings 66 that extend through a bottom wall of the housing 12 of the air filtration unit 11. While the air exhaust openings 66 in the exemplary toilet odor control device are shown as being straight slots it is to be understood that the air exhaust openings may be of any shape, size and disposition selected in accordance with good engineering practice with varying from the scope of the present invention.

In FIG. 9 an electric fan 78 is suspended from the top 17 of the housing of the air filtration unit 11 by a hanger 78A. Depending upon the dimensions of the chamber 220 it may be necessary to provide an indentation 221 in a wall of the chamber to accommodate the fan. The fan 78 is located between the air inlet passage 59 through a side wall of the housing and the filter cartridges 75, 76. Air from the duct in the mounting and air intake unit passes into the chamber 220 via the air inlet passage 59 through a side wall of the housing. Rotation of the electric fan 78 pulls air entering the chamber 220 through the air inlet passage 59 and propels the air downward to pass through the filter cartridges 75, 76 and then through the air exhaust openings 66 to ambient air.

The control switch knob 16 is located on the top 17 of the housing of the air filtration unit is in communication with a suitable electric controller 16A. Electric current originating from cells 49 located behind a battery cover 22 are in circuit communication with the electric controller 16A and the electric fan 78 via suitable electric conductors 16B.

While the exemplary toilet odor control device 10 may be operate manually using the control switch knob 16, FIG. 15 is a top view of another exemplary toilet odor control device 10A of the present invention that can function automatically. This second embodiment is substantially like the embodiment shown in FIGS. 1-14 and functions in substantially the same manner. An electrical pressure switch 250 is incorporated in the mounting and air intake unit 30. The electrical pressure switch 250 is in circuit communication with the electric controller 16A via a suitable electric conductor 260. To support the attachment and detachment of the air filtration unit 11 to the mounting and air intake unit 30 an end 32 of the mounting and air intake unit is provided with an electric contact 261 that mates with a complementary electric contact 262 on the housing 12 of the air filtration unit. When a person sits on a toilet seat of a toilet equipped with a toilet odor control device 10A located between the toilet seat and the toilet bowl the electrical pressure switch 250 closes an electrical circuit to activate the electric fan of the air filtration unit 11. When the person arises from the toilet seat the electrical pressure switch closes opens the electrical circuit. The electric controller can be designed to stop the electric fan either immediately or after an appropriate delay.

Figure 10:
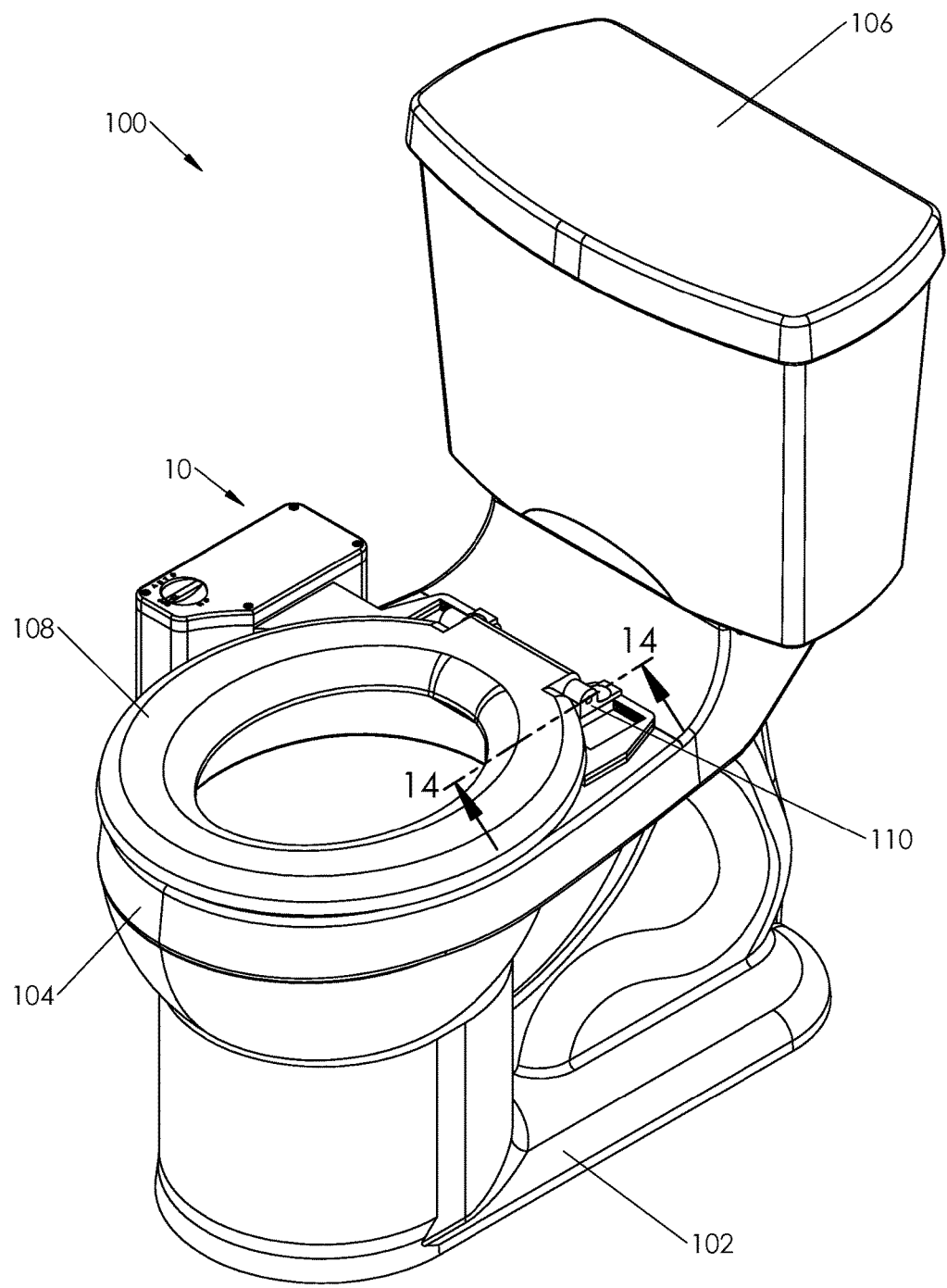
FIG. 10 is a perspective view of the exemplary toilet odor control device mounted to a toilet.
Figure 11:
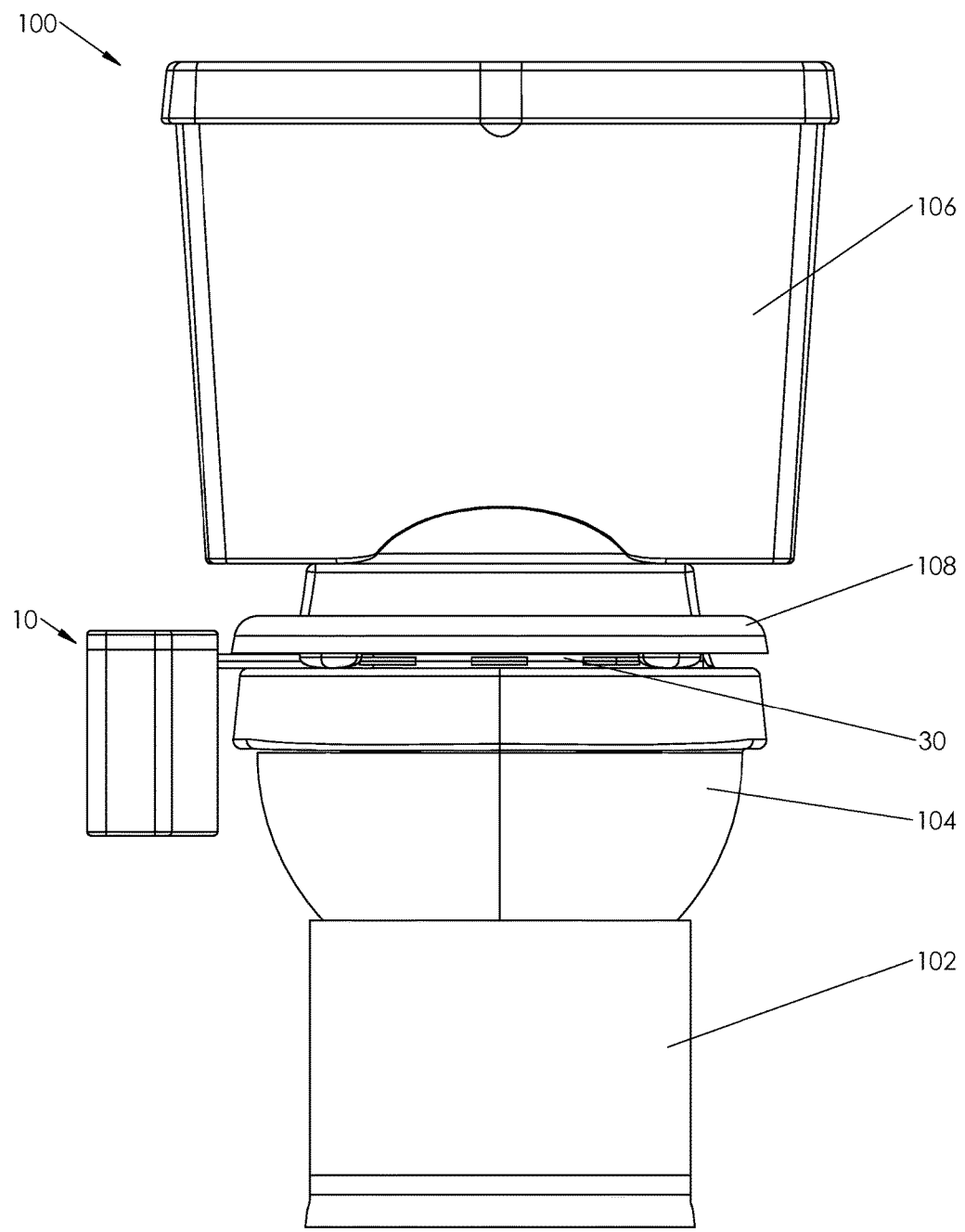
FIG. 11 is a front elevation view of the exemplary toilet odor control device mounted to a toilet.
Figure 12:
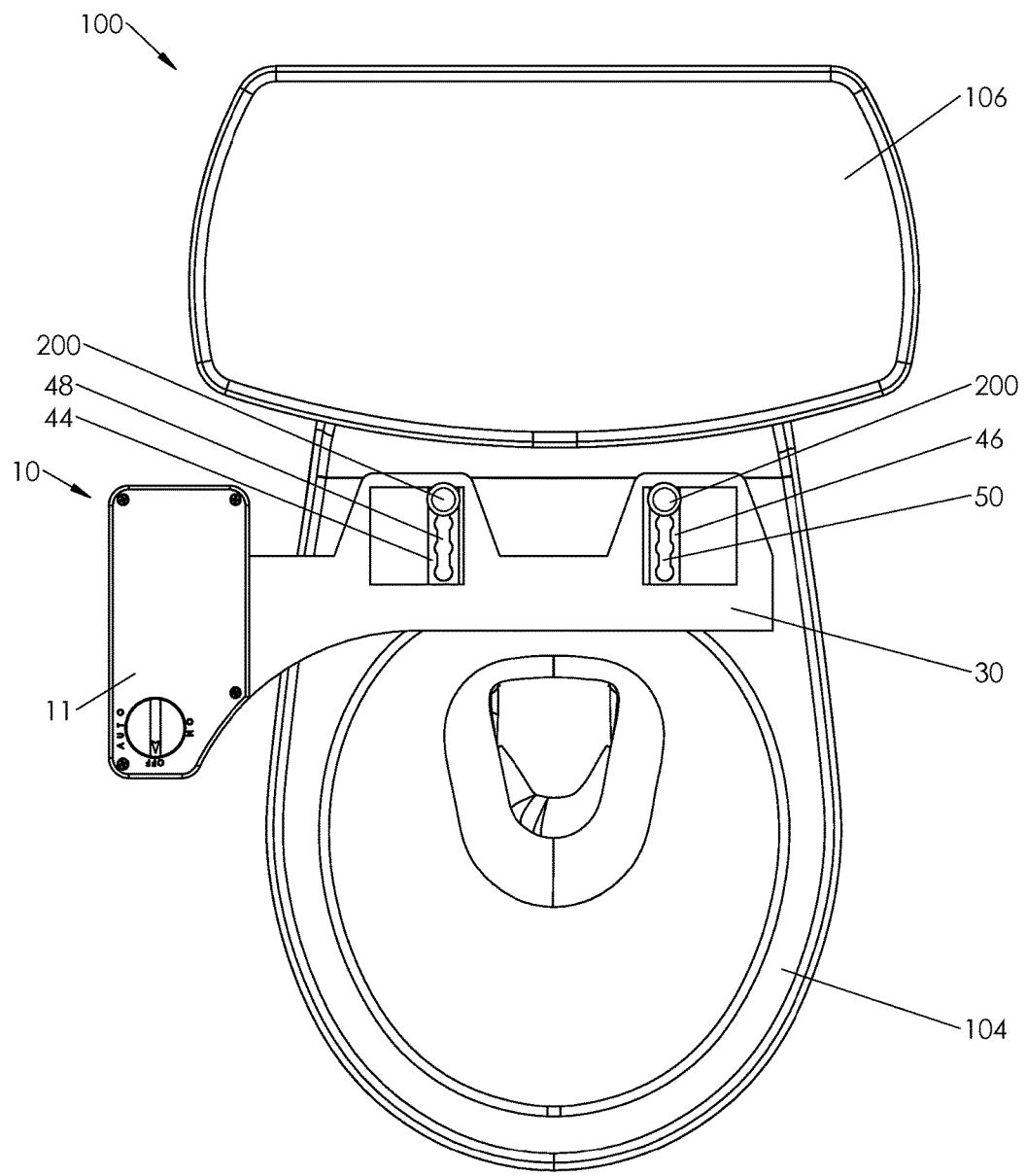
FIG. 12 is a top view of the exemplary toilet odor control device mounted to a toilet without a toilet seat.
Figure 13:
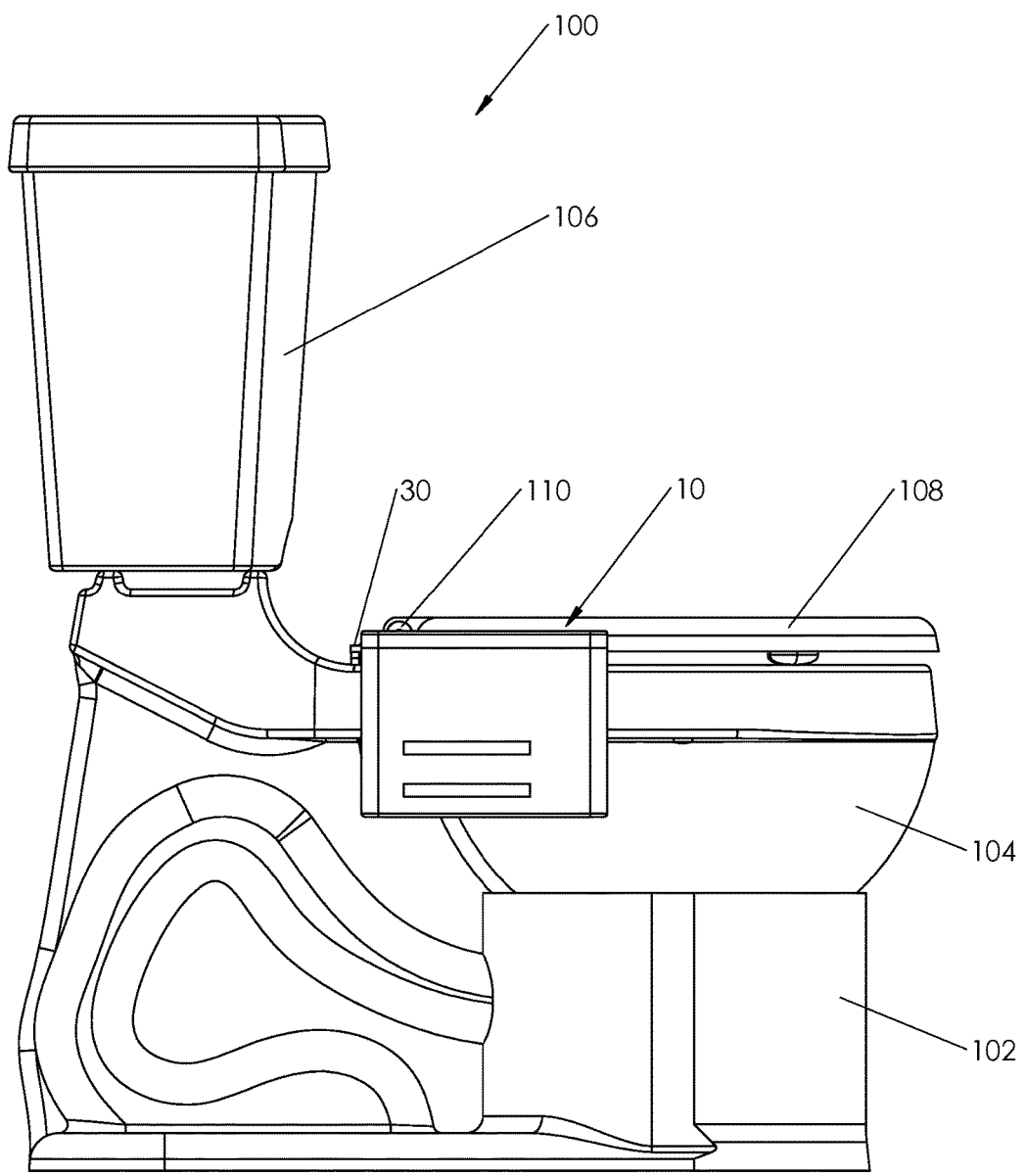
FIG. 13 is a side elevation view of the exemplary toilet odor control device mounted to a toilet.

FIG. 10 is a perspective view of the exemplary toilet odor control device 10 mounted to a toilet 100. FIG. 11 is a front elevation view of the exemplary toilet odor control device 10n mounted to the toilet 100. FIG. 13 is a side elevation view of the exemplary toilet odor control device 10 mounted to the toilet 10. The toilet 10 is of a common design having a base 102, a toilet bowl 104, a toilet tank 106, and a toilet seat 108 provided with a hinge 110. The toilet odor control device 10 is shown installed in an operative configuration with the mounting and air intake unit 30 disposed between the hinge of the toilet seat and a rim of the toilet bowl. The installation of the exemplary toilet odor control device 10 can be disclosed referring to FIG. 12 which is a top view of the exemplary toilet odor control device 10 mounted to a toilet without a toilet seat. The 30 mounting and air intake unit 30 is placed on the rim of the toilet bowl, then the size adjusters 44, 46 are moved to align the slots 48, 50 with bolt receiving holes in the rim of the toilet bowl. For purposes of illustration in FIG. 12 bolts 200 are shown extending through the slots 48, 50 of the size adjusters to secure the mounting and air intake unit 30 to the toilet. When the toilet odor control device is properly mounted to a toilet the air filtration unit is located to a side of the toilet allowing filtered air to be exhausted outside the toilet bowl and facilitate removing the air filtration unit for changing batteries and/or filter cartridges.

Figure 14:
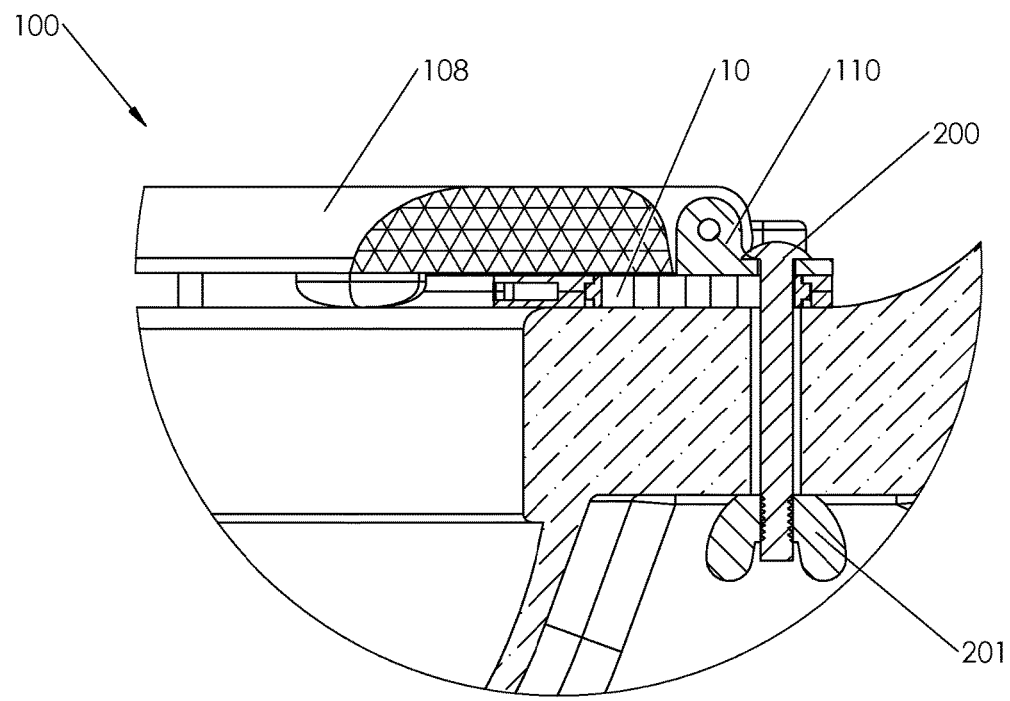
FIG. 14 is a cross section taken at line 14-14 of FIG. 10 showing the use of a toilet seat mounting bolt to secure both a toilet seat and the exemplary toilet odor control device to a toilet.

FIG. 14 is a cross section taken at line 14-14 of FIG. 10 showing the use of a toilet seat mounting bolt 200 to secure both a toilet seat 108 and the exemplary toilet odor control device 10 to a toilet 100. A conventional toilet seat mounting bolt 200 extends through an opening in a hinge 110 in a conventional manner, then through the above described slot of a size adjuster, then through a conventional passage in a rim of a toilet bowl. A conventional wing nut 201 secures the bolt in place, which in turn secures the toilet seat and toilet odor control device to the toilet with the mounting and air intake unit located between the toilet seat and the rim of the toilet bowl.

While the invention has been described with reference to certain exemplary embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A toilet odor control device comprising:
   (a) an air filtration unit including a housing having a removable top, the housing and removable top defining a chamber, a first side wall of the housing having an air inlet passage extending through the first sidewall, an exterior surface of the first sidewall having a pair of parallel grooves therein that are each open at an end of the first sidewall distal from the removable top of the housing and are each closed at an end that nearest to the removable top of the housing, a bottom wall of the housing having at least one air exhaust openings extending through the bottom wall of the housing, a fan mounted inside the chamber with the air filtration unit fan located intermediate of the an air inlet passage extending through the first sidewall and the at least one air exhaust opening extending through the bottom wall of the housing, and at least one filter cartridge located in the chamber with the at least one filter cartridge located intermediate of the fan and the at least one air exhaust opening extending through the bottom wall of the housing; and
   (b) a mounting and air intake unit provided with adjustable members for receiving fasteners for fastening the mounting and air intake unit to a toilet, the mounting and air intake unit being further provided with air intake passages that are each in communication with a duct and allow incoming ambient air to enter the duct, an open end of the duct is aligned with the air inlet passage extending through the first sidewall of the housing of the air filtration unit, first and second spaced apart attachment tabs projecting from the mounting and air intake unit with the attachment tabs received in the parallel grooves in the exterior surface of the first sidewall, the attachment tabs and the parallel grooves having complementary shapes that allow the air filtration unit to be separated from and reattached to the mounting and air intake unit by sliding the air filtration unit relative to the mounting and air intake unit.

2. The toilet odor control device of claim 1 wherein the an air inlet passage extending through the first sidewall of the housing of the air filtration unit is located intermediate of the parallel grooves in the exterior surface of the first sidewall of the housing of the air filtration unit, and the an open end of the duct of the mounting and air intake unit is located intermediate of the attachment tabs of the mounting and air intake unit.

3. The toilet odor control device of claim 1 wherein the air filtration unit is provided with an internal source of electrical energy, and a control switch and an electric controller.

4. The toilet odor control device of claim 2 wherein the air filtration unit is provided with an internal source of electrical energy, and a control switch and an electric controller.

5. The toilet odor control device of claim 3 wherein the mounting and air intake unit is provided with an electrical pressure switch that is in circuit communication with the electric controller.

6. The toilet odor control device of claim 4 wherein the mounting and air intake unit is provided with an electrical pressure switch that is in circuit communication with the electric controller.

7. The toilet odor control device of claim 1 wherein the attachment tabs of the mounting and air intake unit and the grooves in the in the exterior surface of the first sidewall of the housing of the air filtration unit are configured to mate in a dovetail manner.

8. The toilet odor control device of claim 2 wherein the attachment tabs of the mounting and air intake unit and the grooves in the in the exterior surface of the first sidewall of the housing of the air filtration unit are configured to mate in a dovetail manner.

9. The toilet odor control device of claim 3 wherein the attachment tabs of the mounting and air intake unit and the grooves in the in the exterior surface of the first sidewall of the housing of the air filtration unit are configured to mate in a dovetail manner.

10. The toilet odor control device of claim 4 wherein the attachment tabs of the mounting and air intake unit and the grooves in the in the exterior surface of the first sidewall of the housing of the air filtration unit are configured to mate in a dovetail manner.

11. The toilet odor control device of claim 5 wherein the attachment tabs of the mounting and air intake unit and the grooves in the in the exterior surface of the first sidewall of the housing of the air filtration unit are configured to mate in a dovetail manner.

12. The toilet odor control device of claim 6 wherein the attachment tabs of the mounting and air intake unit and the grooves in the in the exterior surface of the first sidewall of the housing of the air filtration unit are configured to mate in a dovetail manner.

13. The toilet odor control device of claim 1 wherein two filter cartridges are located in the chamber, one of the filter cartridges comprising an activated charcoal filter and one of the filter cartridges comprising a scented filter, both of the filter cartridges located intermediate of the fan and the at least one air exhaust opening extending through the bottom wall of the housing.

14. The toilet odor control device of claim 2 wherein two filter cartridges are located in the chamber, one of the filter cartridges comprising an activated charcoal filter and one of the filter cartridges comprising a scented filter, both of the filter cartridges located intermediate of the fan and the at least one air exhaust opening extending through the bottom wall of the housing.

15. The toilet odor control device of claim 2 wherein two filter cartridges are located in the chamber, one of the filter cartridges comprising an activated charcoal filter and one of the filter cartridges comprising a scented filter, both of the filter cartridges located intermediate of the fan and the at least one air exhaust opening extending through the bottom wall of the housing.

16. The toilet odor control device of claim 3 wherein two filter cartridges are located in the chamber, one of the filter cartridges comprising an activated charcoal filter and one of the filter cartridges comprising a scented filter, both of the filter cartridges located intermediate of the fan and the at least one air exhaust opening extending through the bottom wall of the housing.

17. The toilet odor control device of claim 4 wherein two filter cartridges are located in the chamber, one of the filter cartridges comprising an activated charcoal filter and one of the filter cartridges comprising a scented filter, both of the filter cartridges located intermediate of the fan and the at least one air exhaust opening extending through the bottom wall of the housing.

18. The toilet odor control device of claim 6 wherein two filter cartridges are located in the chamber, one of the filter cartridges comprising an activated charcoal filter and one of the filter cartridges comprising a scented filter, both of the filter cartridges located intermediate of the fan and the at least one air exhaust opening extending through the bottom wall of the housing.

19. The toilet odor control device of claim 7 wherein two filter cartridges are located in the chamber, one of the filter cartridges comprising an activated charcoal filter and one of the filter cartridges comprising a scented filter, both of the filter cartridges located intermediate of the fan and the at least one air exhaust opening extending through the bottom wall of the housing.

20. The toilet odor control device of claim 10 wherein two filter cartridges are located in the chamber, one of the filter cartridges comprising an activated charcoal filter and one of the filter cartridges comprising a scented filter, both of the filter cartridges located intermediate of the fan and the at least one air exhaust opening extending through the bottom wall of the housing.

* * * * *